US010585901B2

(12) United States Patent
Allen et al.

(10) Patent No.: US 10,585,901 B2
(45) Date of Patent: Mar. 10, 2020

(54) TAILORING QUESTION ANSWER RESULTS TO PERSONALITY TRAITS

(71) Applicant: International Business Machines Corporation, Armonk, NY (US)

(72) Inventors: Corville O. Allen, Morrisville, NC (US); Luis A. Benitez, Guaynabo, PR (US); Laura J. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1255 days.

(21) Appl. No.: 14/588,520

(22) Filed: Jan. 2, 2015

(65) Prior Publication Data

US 2016/0196265 A1 Jul. 7, 2016

(51) Int. Cl.
*G06F 16/2457* (2019.01)
*G06F 16/23* (2019.01)
*G06F 16/248* (2019.01)
*G06F 16/9535* (2019.01)

(52) U.S. Cl.
CPC ........ *G06F 16/24578* (2019.01); *G06F 16/23* (2019.01); *G06F 16/248* (2019.01); *G06F 16/24575* (2019.01); *G06F 16/9535* (2019.01)

(58) Field of Classification Search
CPC ........... G06F 17/3053; G06F 17/30345; G06F 17/30528; G06F 17/30554; G06F 17/30867
See application file for complete search history.

(56) References Cited

U.S. PATENT DOCUMENTS

| 8,805,756 | B2 | 8/2014 | Boss et al. | |
| 2002/0156774 | A1* | 10/2002 | Beauregard | ......... G06F 9/45512 |
| 2004/0243568 | A1 | 12/2004 | Wang et al. | |
| 2006/0206481 | A1* | 9/2006 | Ohkuma | ........... G06F 17/30654 |
| 2008/0195378 | A1* | 8/2008 | Nakazawa | ........ G06F 17/30654 |
| | | | | 704/9 |

(Continued)

OTHER PUBLICATIONS

"Question Answering", Wikipedia, accessed on Nov. 21, 2014, 9 pages.

(Continued)

*Primary Examiner* — Mark E Hershley
*Assistant Examiner* — Dustin D Eyers
(74) *Attorney, Agent, or Firm* — Stephen J. Walder, Jr.; Diana R. Gerhardt

(57) ABSTRACT

Mechanisms, in a Question and Answer (QA) system comprising a processor and a memory are provided for generating an answer to a question. A question is received for which an answer is sought as part of a communication exchange. The question is processed to generate candidate answers and corresponding confidence scores and perform a context based selection of a final answer from the candidate answers. The selected final answer is output as a final answer to the question via a computing device. The context based selection involves determining a context of the input question and selecting a final answer from the one or more candidate answers based on the context of the input question. The selected final answer is an answer previously provided in association with the context of the question.

21 Claims, 5 Drawing Sheets

(56) References Cited

U.S. PATENT DOCUMENTS

| | | | |
|---|---|---|---|
| 2008/0311934 A1* | 12/2008 | Soderstrom | G06Q 30/02 455/466 |
| 2009/0037398 A1 | 2/2009 | Horvitz et al. | |
| 2009/0287678 A1 | 11/2009 | Brown et al. | |
| 2010/0185566 A1* | 7/2010 | Schott | G06N 5/043 706/10 |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0124449 A1* | 5/2013 | Pinckney | G06F 17/30867 706/52 |
| 2013/0262501 A1 | 10/2013 | Kuchmann-Beauger et al. | |
| 2014/0006012 A1 | 1/2014 | Zhou et al. | |
| 2014/0058986 A1 | 2/2014 | Boss et al. | |
| 2014/0257990 A1* | 9/2014 | Cudgma | G06Q 30/0269 705/14.66 |
| 2014/0289016 A1* | 9/2014 | Muto | G06Q 30/0203 705/7.32 |
| 2015/0089568 A1* | 3/2015 | Sprague | H04L 63/0876 726/1 |

OTHER PUBLICATIONS

Dong, Tiansi et al., "A Natural Language Question Answering System as a Participant in Human Q&A Portals", Proceedings of the Twenty-Second International Joint Conference on Artificial Intelligence, Jul. 16-22, 2011, pp. 2430-2435.

High, Rob, "The Era of Cognitive Systems: An Inside Look at IBM Watson and How it Works", IBM Corporation, Redbooks, Dec. 12, 2012, 16 pages.

Mccord, M.C. et al., "Deep parsing in Watson", IBM J. Res. & Dev. vol. 56 No. 3/4 Paper 3, May/Jul. 2012, pp. 3:1-3:15.

Popkin, Jamie, "Google, Apple Siri and IBM Watson: The Future of Natural-Language Question Answering in Your Enterprise", Gartner. com, https://www.gartner.com/doc/2534823/google-apple-siri-ibm-watson, Jun. 28, 2013, 2 pages.

Srihari, Rohini et al., "A Question Answering System Supported by Information Extraction", ANLC '00 Proceedings of the sixth conference on Applied natural language processing, http://www.aclweb.org/anthology/A00-1023.pdf, Apr. 29, 2000, pp. 166-172.

Yuan, Michael J., "Watson and healthcare, How natural language processing and semantic search could revolutionize clinical decision support", IBM developerWorks, IBM Corporation, Apr. 12, 2011, 14 pages.

* cited by examiner

Samantha:
Hey Dave.

Samantha:
What is the release schedule for project Bravo?

⊛ Dave's Cognitive System:
Project Bravo has Q4 QDCP commitments on 8/15 and the final release is on 8/29.

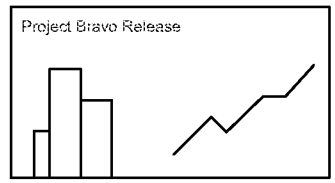

www.relevantimage.com/resource

This answer is based on the answers Dave recently gave 6 people, that 5 out of 6 people found useful. 3 of these people were product manager, like you.

Did you find this answer useful?

Samantha:

Yes. It is perfect. Thanks.

TAILORING QUESTION ANSWER RESULTS TO PERSONALITY TRAITS

BACKGROUND

The present application relates generally to an improved data processing apparatus and method and more specifically to mechanisms for tailoring the results, generated by a Question and Answer (QA) pipeline of a cognitive system, to the personality trait of a user that submitted the question.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a Question and Answer (QA) system comprising a processor and a memory. The method comprises receiving, by the QA system, an input question for which an answer is sought as part of a communication exchange. The method further comprises processing, by the QA system, the input question to generate one or more candidate answers and corresponding confidence scores and performing, by the QA system, a context based selection of a final answer from the one or more candidate answers. Moreover, the method comprises outputting the selected final answer as a final answer to the input question via a computing device. The context based selection comprises determining, by the QA system, a context of the input question and selecting, by the QA system, a final answer from the one or more candidate answers based on the context of the input question, wherein the selected final answer is an answer previously provided in association with the context of the input question.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example diagram of a user interface showing textual messaging that may be generated in accordance with one illustrative embodiment.

DETAILED DESCRIPTION

Figure 1:
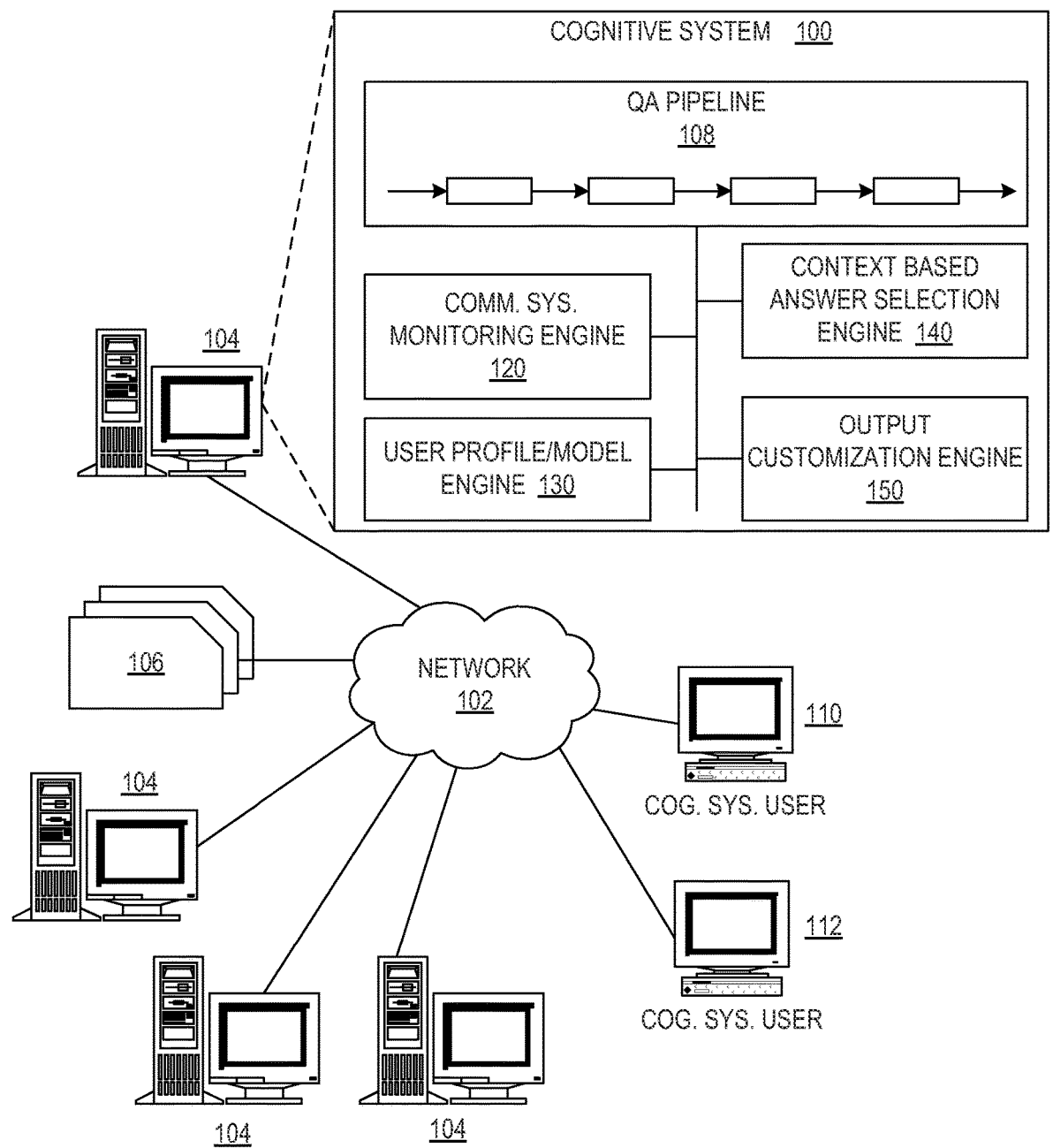
FIG. 1 depicts a schematic diagram of one illustrative embodiment of a cognitive system implementing a Question and Answer (QA) pipeline in a computer network.

The illustrative embodiments provide mechanisms for tailoring or customizing the results of a question and answer pipeline of a cognitive system to the particular personality trait(s) of the user requesting the answer to the question. The illustrative embodiments retrieve a user profile or model for the user that includes one or more personality traits of the user. The illustrative embodiments then find a set of correct candidate answers for a question using a Question and Answer (QA) pipeline of a cognitive system based on the context of the question. The candidate answers are analyzed based on the personality trait of the user requesting the answer and the presentation of the candidate answers is tailored or customized to the personality trait of the requesting user.

For example, during an instant messaging session between Samantha and Dave, Samantha may ask Dave, "What is the release schedule for project Bravo?". The QA system monitoring the instant messaging session may capture the question and automatically search a corpus of information which may include, among other information, the context of Dave's previous historical communications (as a contextually identified corpus, i.e. Dave's corpus), to identify an answer to the question. Answers that have a high enough confidence will be automatically returned. Answers that have a medium or low confidence will defer to the context of the previous historical communications. Thus, in the above example, if there is no highly ranked candidate answer, an answer may be obtained from Dave's previous historical responses to the same or similar question with information indicating the basis for the candidate answer. The candidate answers and the previously obtained feedback for the candidate answers from other users are compared to the personality trait of the user and used to tailor the presentation of the candidate answer.

For example, the answer may be of the type "Project Bravo has Q4 QDCP commitments on August 15 and the final release on August 29 . . . this answer is based on the answers Dave recently gave 6 people. 5 out of 6 people found this answer useful. 3 of those people were product managers like you. Did you find this answer useful?" In this example, the information about the answer itself may be obtained from previous answers given by Dave to the same or similar questions as identified from Dave's context. Within this context, the answer may be associated with one or more statistical values indicative of the number of other users that received the answer from Dave and the number of these other users that indicated in a response back that they found the answer useful and a number of other users that indicated in the response back that they found the answer not useful. Moreover, information about each responding user may be obtained from corresponding user profiles and/or organizational data to thereby identify a background, personality trait, or the like, of these other users to give information about the type of user that responded to the answer positively or negatively.

In accordance with one illustrative embodiment, in operation, a Question and Answer (QA) pipeline of a cognitive system, such as the IBM Watson™ cognitive system available from International Business Machines (IBM) Corporation or Armonk, N.Y., receives an input question for which an answer is sought as part of a communication exchange between client computing devices of two or more users, a requesting user, i.e. a user requesting an answer to the input question, and at least one recipient of the input question. For example, during an instant messaging or chat session a first user (requesting user) may ask the online community (other users) with which he/she is interacting through the exchange of instance message communications, a question that the requesting user expects to be answered by the online community. The question may be captured or intercepted by the cognitive system, such as via a monitoring engine that monitors online community activity for questions either in the foreground or background, and processed as if it were a question sent to the cognitive system. Alternatively, the mechanisms of the illustrative embodiments may be implemented with questions that are directly input to the cognitive system as a question that the requesting user is asking of the cognitive system itself.

In either case, the input question is processed by the QA pipeline of the cognitive system to generate one or more candidate answers and corresponding confidence scores. The confidence scores are compared to one or more threshold confidence scores to determine if any of the one or more candidate answers meets or exceeds the one or more threshold confidence scores and thus, has strong supporting evidence that the corresponding candidate answer is a correct answer for the input question. If so, then the corresponding candidate score is returned as the correct answer for the input question.

If a candidate answer with a sufficiently high enough confidence score, as determined by the comparison to the one or more threshold confidence score values, is not identified by the QA pipeline, then a context based selection and/or generation of a candidate answer is initiated by the cognitive system to identify an answer to the input question. In the case of a context based answer selection/generation, a context of the input question is determined where the context represents a historical set of questions and answers previously answered by users during previous conversations over an electronic medium, such as via an online community, instant messaging system, electronic mail system, or any other electronic communication mechanism by which users communicate information. In some illustrative embodiments, the electronic medium is an online community of users that utilize an online community service to exchange electronic communications and content, such as a social networking website, e.g., Facebook®, Instagram®, LinkedIn®, or the like. Thus, the context represents a sub-corpus of a larger corpus of content which will be used to fine tune or tailor/customize an answer returned by the QA pipeline to the input question.

The context of the input question may be determined based on the content of the input question itself and the features of the input question that are extracted by the QA pipeline. The context may be associated with a particular user, particular project, particular event, or any other concept that may be the focus of an input question or about which users may communicate with one another. For example, in one illustrative embodiment, the context may comprise a project or event and the sub-corpus comprises communications from users via one or more communication systems about the project or event.

In one illustrative embodiment, the cognitive system monitors communications via a communication system, online community, or the like, for questions posed to a particular party to the communication. The context of the question may then be limited to answers previously provided by the party to which the question is posed to similar questions. For example, if Samantha sends a question to Dave of the type "What is the release schedule for project Bravo?," then the recipient party is Dave and the context of the input question is limited to previous answers provided by Dave to the same or similar questions. A historical record of Dave's previous communications may be stored in association with a user profile/model of Dave so as to provide a sub-corpus of content upon which the QA pipeline may operate to generate the candidate answers/final answer to the input question.

Based on the identified context, the corresponding-sub corpus is searched to identify candidate answers to the input question and/or filter the previously generated set of candidate answers. Additional supporting evidence for any of the candidate answers may be obtained from the corpus as a whole and used to supplement the candidate answer supporting evidence and/or ultimately provide additional content for output to the requesting user as a final answer to the input question. From the set of candidate answers generated as a result of the context based question answering performed by the QA pipeline, a final answer is selected for output to the requesting user.

The output of the final answer may be tailored or customized to the particular personality traits of the requesting user. The personality traits may be specified, for example, in a user profile associated with the cognitive system, the electronic communication system, the online community service used to exchange the electronic communications, or the like. Through configuration information associated with the cognitive system, personality traits are associated with different types of information that users having those personality traits are most likely interested in or which resonate more with users having those personality traits. Thus, for example, an introvert may be more interested in statistics, detailed information about support for a particular candidate answer, or the like, while an extroverted individual may be more interested in a general overview or high level representation of the supporting evidence for a particular answer. For example, an introverted user may receive an answer of the type "Project Bravo has Q4 QDCP commitments on August 15 and the final release on August 29" whereas an extrovert may receive an answer of the type "Project Bravo is scheduled for release by the end of August."

Moreover, the output may be augmented to provide the basis, based on the identified context, for the answer. For example, a number of times the answer has been provided within the context for the same or similar question. User feedback information associated with the answer within the context may also be retrieved and used to augment the answer that is provided back to the requesting user, e.g., the number of users that found the answer useful or not useful. The output of the answer may further request additional feedback from the requesting user as to whether they find the answer useful or not useful and this feedback may be accumulated in association with the answer for future answering of the same or similar question.

Thus, the illustrative embodiments provide mechanisms for selecting an answer to a question based on a user's historical context of answering similar questions in situations where a generated answer from a full corpus does not have sufficient confidence. The illustrative embodiments further provide mechanisms for customizing or tailoring the output of the selected answer based on personality traits of the individual that submitted the question.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
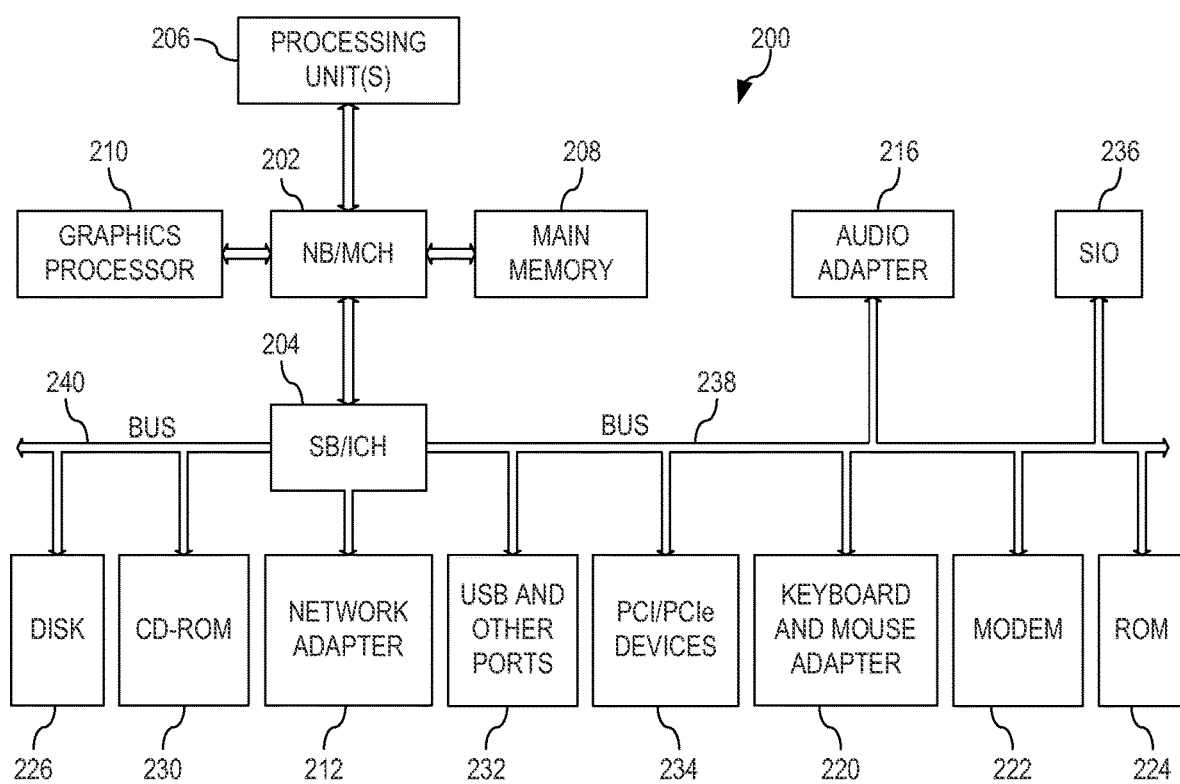
FIG. 2 is a block diagram of an example data processing system in which aspects of the illustrative embodiments are implemented.
Figure 3:
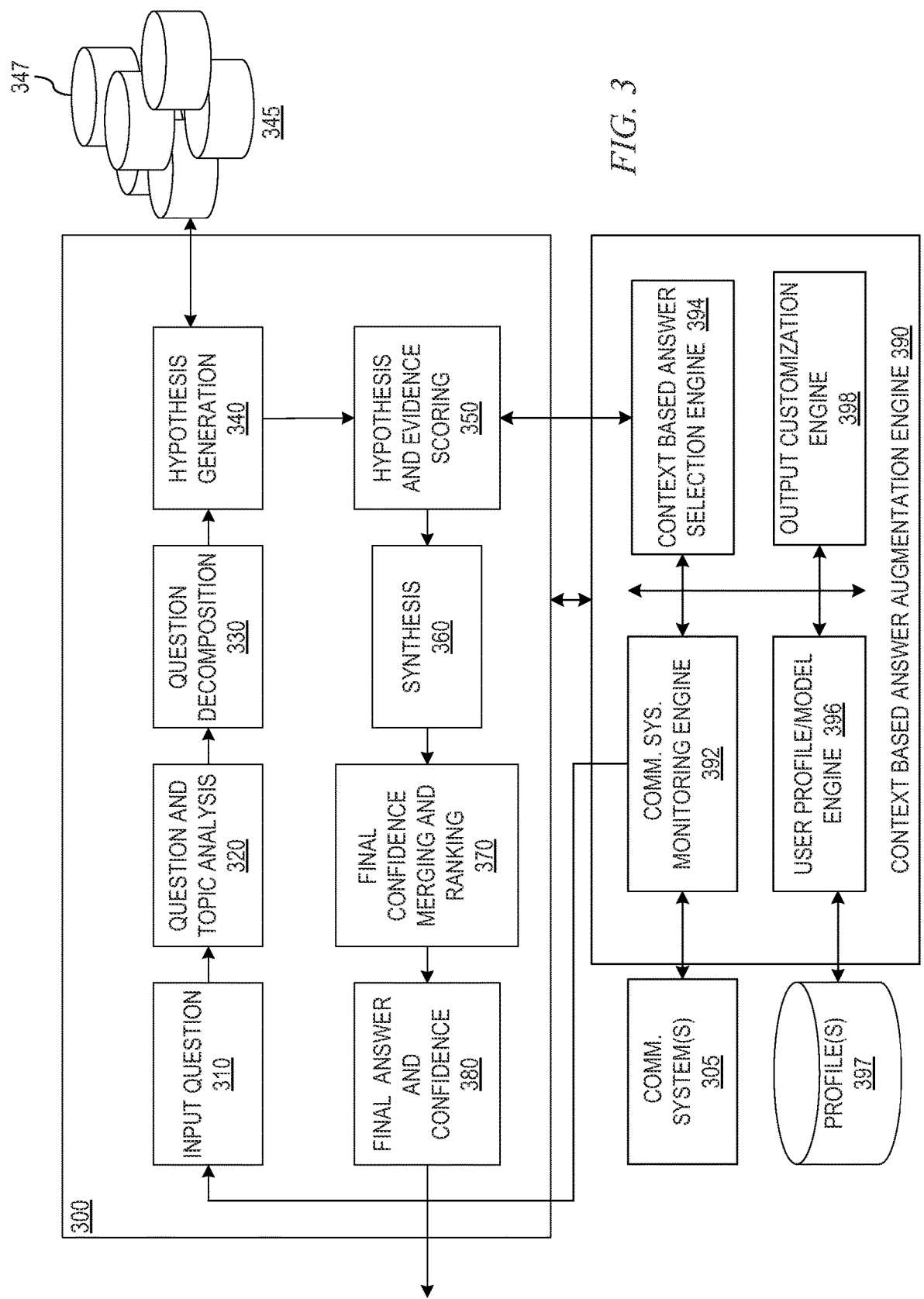
FIG. 3 illustrates an example of a QA pipeline portion of a cognitive system in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. As will be discussed in greater detail hereafter, the illustrative embodiments are integrated in, augment, and extend the functionality of these QA mechanisms of the cognitive system with regard to providing a context based answer selection/generation and answer output customization/tailoring based on a requesting user's personality traits.

Thus, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like high accuracy at speeds far faster than human beings and on a larger scale. In general, such cognitive systems are able to perform the following functions:

- Navigate the complexities of human language and understanding
- Ingest and process vast amounts of structured and unstructured data
- Generate and evaluate hypothesis
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situational awareness that mimic human cognition based on experiences
- Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a communication system monitoring engine 120, a user profile/model engine 130, a context based answer selection engine 140, and an output customization engine 150. In accordance with one illustrative embodiment, in operation, cognitive system 100 receives an input question for which an answer is sought as part of a communication exchange between client computing devices of two or more users, a requesting user, i.e. a user requesting an answer to the input question, and at least one recipient of the input question.

For example, the input question may be obtained by the communication system monitoring engine 120 monitoring one or more communication systems, such as an instant messaging or chat communication system, an online community such as a social networking website, special interest website, etc., electronic mail system, or the like. Such online communities, communication systems, or the like, may be hosted by one or more of the servers 104 coupled to the network 102. The communication system monitoring engine 120 comprises logic for identifying key terms/phrases, punctuation, and other format/content patterns indicative of a question being asked as part of an exchange of communications. Terms such as "Who", "What", "Where", "When", "How", and punctuation such as "?" may be recognized in textual communications exchanged via the communication system and captured for processing by the cognitive system 100. For example, a first user (requesting user) of a social networking website hosted by a server 104 may ask an online community (other users) with which he/she is interacting through the exchange of instant message communications, a question that the requesting user expects to be answered by the online community and this question may be intercepted by the communication system monitoring engine 120, operating in the background, and provided as an input question to the cognitive system 100. Alternatively, the mechanisms of the illustrative embodiments may be implemented with questions that are directly input to the cognitive system 100 as a question that the requesting user is asking of the cognitive system 100 itself, such as via an interface presented on the requesting user's client computing device 110, 112.

In either case, the input question received in the cognitive system 100 is processed by the QA pipeline 108 to generate one or more candidate answers and corresponding confidence scores. The confidence scores are compared by the context based answer selection engine 140 to one or more threshold confidence scores to determine if any of the one or more candidate answers meets or exceeds the one or more threshold confidence scores and thus, has strong supporting evidence that the corresponding candidate answer is a correct answer for the input question. If so, then a final answer is selected by the QA pipeline 108 from those candidate answers whose confidence scores meet or exceed the one or more thresholds and is provided to the output customization engine 150 for generation of a final answer output to be returned to the requesting user via the network 102 and the requesting user's client device 110, 112.

If a candidate answer with a sufficiently high enough confidence score, as determined by the comparison to the one or more threshold confidence score values performed by the context based answer selection engine 140, is not identified, then a context based selection and/or generation of a candidate answer is initiated in the context based answer selection engine 140 to identify an answer to the input question. In the case of a context based answer selection/generation, a context of the input question is determined where the context represents a historical set of questions and answers previously answered by users during previous conversations over the same and/or other communication systems, such as via an online community, instant messaging system, electronic mail system, or any other electronic communication mechanism by which users communicate information. Thus, the context represents a sub-corpus of a larger corpus of content which will be used to fine tune or tailor/customize an answer returned by the QA pipeline 108 to the input question.

The context of the input question may be determined based on the content of the input question itself and the features of the input question that are extracted by the QA pipeline 108. The context may be associated with a particular user, particular project, particular event, or any other concept that may be the focus of an input question or about which users may communicate with one another. For example, in one illustrative embodiment, the context may comprise a project or event and the sub-corpus comprises communications from users via one or more communication systems about the project or event. The context may be a combination of individual contexts, e.g., the context may be communications by a particular user (first context) regarding a particular project or event (second context).

In one illustrative embodiment, the communication system monitoring engine 120 monitors communications via a communication system, online community, or the like, for questions posed to a particular party to the communication. The context of the question may then be limited to answers, previously provided by the party or parties to which the question is posed, to similar questions. Alternatively, the context of the question may be limited to answers previously provided by any user that is associated with the communication systems with which the requesting user is associated or through which the question is currently being presented. A historical record of Dave's previous communications may be stored in association with a user profile of Dave which is retrieved by the user profile/model engine 130 so as to provide a sub-corpus of content upon which the QA pipeline 108 may operate to generate the candidate answers/final answer to the input question. The user profiles may be associated with the cognitive system 100 and/or communication systems provided by the servers 104 of the network 102. Thus, for example, a user may have one or more profiles established with one or more communication systems, e.g., websites, social networks, newsgroups, and/or the like. These profiles may have associated logs of communications submitted by the particular user.

These logs may be retrieved by the user profile/model engine 130 and used to compose a model of the user. The profiles may specify personality traits of the user or such personality traits may be generated through analysis of the user's information and communications. For example, the user profile/model engine 130 may analyze the user's background, occupation, gender, age, key terms/phrases used in communications, content of the communications, and the like, to identify a match between the user and a plurality of pre-defined personality traits. Various calculations performed by personality trait determination algorithms may be utilized to correlate the user information and features extracted from the user's previous communications with particular personality traits. Different user information and extracted features may be weighted differently for different types of personality traits. In this way, a model of the user's personality traits is generated. For example, a user model may specify the following personality traits and corresponding statistical values indicative of matching with each of these personality traits exhibited by the user as determined by the analysis of the user's information and communication:

```
"bigTraits" : {
    "openness": 86,
    "conscientiousness": 65,
    "extraversion" : 32,
    "aggreableness" : 92,
    "neuroticism" : 27
},
```

Based on the identified context, the corresponding sub-corpus is searched by the context based answer selection engine 140 to identify candidate answers to the input question and/or filter the previously generated set of candidate answers generated by the QA pipeline 108. This sub-corpus comprises the similar questions and answers within the identified context. These answers may be retrieved as additional candidate answers and/or may be correlated with the candidate answers previously generated by the QA pipeline to thereby select those previously generated candidate answers for further evaluation. Additional supporting evidence for any of the candidate answers may be obtained from the corpus as a whole and used to supplement the candidate answer supporting evidence and/or ultimately provide additional content for output to the requesting user as a final answer to the input question. From the set of candidate answers generated as a result of the context based question answering performed by the context based answer selection engine 140, a final answer is selected for output to the requesting user. The context based answer selection engine 140 may utilize logic provided in the QA pipeline 108 to perform such searching of the corpus and selection of a final answer as described hereafter, but with the context based answer selection engine 140 controlling the scope of the search and the selection of the final answer in accordance with the identified context.

The output of the final answer may be tailored or customized by the output customization engine 150 to the particular personality traits of the requesting user. As discussed above, the user profile/model engine 130 may retrieve and/or generate a user model comprising information about the personality traits of the requesting user. Through configuration information associated with the output customization engine 150, personality traits are associated with different types of information that users having those personality traits are most likely interested in or which resonate more with users having those personality traits. For example, a personality trait of "extraversion" may be associated with high level interaction type information while a personality trait of "conscientiousness" may be associated with a lower level detail oriented type of information. A user model may have multiple personality traits and corresponding matching values which may be evaluated to identify a predominant personality trait that is used to select the level of information that should be provided in a final answer output. Alternatively, other aggregations of personality traits may be utilized to select a level or type of information to be included in the output of the final answer, e.g., a weighted aggregation of the personality trait matching values or the like. Based on the determined level or type of information associated with the user's personality traits, the final answer and its supporting evidence are filtered to select the information matching the determined level or type of information so as to provide that selected information as part of the final answer output.

Moreover, the output customization engine 150 may further augment the output of the final answer to provide the basis, based on the identified context, for the answer. For example, a number of times the answer has been provided within the context for the same or similar question may be returned along with the final answer. Such information may be maintained in association with the answer and question in the log data structure associated with the user profile of the user providing the answer. User feedback information associated with the answer within the context may also be retrieved and used to augment the answer that is provided back to the requesting user, e.g., the number of users that found the answer useful or not useful.

The output of the answer generated by the output customization engine 150 may further request additional feedback from the requesting user as to whether they find the answer useful or not useful. This feedback may be accumulated in association with the answer for future answering of the same or similar question. Thus, the number of users that this answer was provided to, as well as the number of users that found this answer useful or not useful, may be updated.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show."

Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the QA pipeline 300 is further augmented to include or work in association with a context based answer augmentation engine 390. The context based answer augmentation engine 390 comprises a communication system monitoring engine 392, a context based answer selection engine 394, a user profile/model engine 396, and an output customization engine 398. These elements are similar to the elements 120-150 described above with regard to FIG. 1 and perform similar corresponding operations. In particular, the communication system monitoring engine 392 monitors communication systems 305 for textual input that includes a question that can be processed by the QA pipeline 300. If such a question is detected in the textual input, the question is submitted to the QA pipeline 300 as an input question in stage 310. The context based answer selection engine 394 obtains candidate answers and corresponding confidence scores calculated by the QA pipeline 300, such as from hypothesis and evidence scoring stage 350, and compares the confidence scores to one or more thresholds to determine if any of the candidate answers have sufficiently high enough confidence scores to warrant output as a final answer without having to perform context based answer selection. For example, if a candidate answer has a confidence score of 0.90 (90% confidence) and the threshold is 0.80, then no further context based answer selection is necessary and the corresponding candidate answer may be automatically included in the answers for selection of a final answer to be output. However, if the confidence scores of the candidate answers are not equal to or above the threshold, e.g., 0.80, then context based answer selection may be initiated by the context based answer selection engine 394.

As discussed above, the context based answer selection engine 394, in response to a determination that context based answer selection should be performed based on the results of the comparison of the confidence scores to the one or more thresholds, determines a context of the input question and, via the user profile/model engine 396, accesses the profile 397 of the user(s) specified in the context. The communication logs of the user(s) are then searched as a sub-corpus to find answers to similar questions previously answered by these user(s). Moreover, basis information for these answers is also retrieved that identifies the users to which the answer was previously provided as well as user feedback information which may indicate how many of these users found the answer to be useful or not useful. These answers are evaluated and ranked along with the other candidate answers generated by the QA pipeline 300, or otherwise used to correlate with the QA pipeline 300 generated candidate answers to select a subset of these candidate answers, to generate the ranked listing of candidate answers from which a final answer is selected in accordance with stages 360-380 as discussed above.

The final answer selected in stage 380 may be provided to the output customization engine 398 which customizes the output of the final answer in accordance with the personality traits of the requesting user. That is, for example, the user profile(s) 397 of the requesting user are also retrieved and used to generate a user model specifying one or more personality traits of the requesting user. Based on the one or more personality traits of the user specified in the model, the corresponding levels and types of information for those personality traits are identified via configuration information of the output customization engine 398. The final answer and its supporting evidence information are then filtered to identify the final answer information and supporting evidence information that matches the level and type of information for the user's personality traits and the output customization engine 398 then formulates the output of the final answer to match the personality trait of the user.

FIG. 4 is an example diagram of a user interface showing textual messaging that may be generated in accordance with one illustrative embodiment. As shown in FIG. 4, as part of a textual conversation between a requesting user, Samantha, and a recipient user, Dave, the requesting user submits a question to the recipient user of the type "What is the release schedule for project Bravo?" The cognitive system of the illustrative embodiments, through its monitoring of the communication system being used by Samantha to contact Dave using this textual conversation, identifies the textual input from Samantha as a question due to the use of the term "What" and the punctuation "?", for example.

The captured question is then submitted to the QA pipeline of the cognitive system which processes the question to generate candidate answers. It is assumed that in this example, no candidate answer is retrieved that has a sufficiently high enough confidence to warrant immediate return as a final answer and thus, a context based answer selection is initiated. As a result, the context of the input question is determined to include the recipient user, Dave and the focus of the question, i.e. project Bravo.

Based on the identified context, the user profiles for the requesting user, Samantha, and the recipient user, Dave, are retrieved. The user profile for Dave is searched for answers to previous similar questions. The information about the answers previously provided by Dave to similar questions is retrieved and used to formulate additional candidate answers with corresponding confidence scores through analysis of the corpus and the like as discussed above. A final answer is selected from the candidate answers along with the supporting evidence and information about the user feedback and distribution of the answer to other users as retrieved from Dave's profile.

The user profile of the requesting user is used to generate a user model for the requesting user, i.e. Samantha, to determine one or more personality traits of Samantha. In this case, through analysis of Samantha's user information and previous communications as set forth in her log of communications, it is determined that Samantha is a conscientious individual that is detail oriented. This personality trait is correlated with a level and type of information through configuration information which maps personality traits to types and levels of supporting evidence information. As a result, the output of the answer to Samantha includes a graph and details of the release schedule for project Bravo when other users that are less conscientious or detail oriented may get an answer that is more high level, such as "Project Bravo will be released in August."

It should be noted that the indicator of the source of the answer in the communication exchange depicted in FIG. 4 is changed to clearly represent the cognitive system as the source of the answer to the question posed by Samantha. In this way, the requesting user is informed that the source of the answer is not the other party but rather a cognitive system that has answered the question on behalf of the recipient party.

Moreover, as shown in FIG. 4, the output of the final answer is further augmented to include basis information retrieved from the answers in the communication logs of the profile of the recipient user. Thus, for example, in this scenario, Dave previously provided the output answer to 6 other users and thus, the answer that is output during this communication session by the cognitive system specifies that the basis for this answer is the answers Dave gave recently to 6 people. Moreover, information about these other users may be output including the backgrounds of these other users (as determined from their profiles) and the user feedback from these users may also be output. In the depicted example, 5 out of the 6 other users found the answer to be useful and 3 of the people that found the answer to be useful were managers like Samantha. That is, the characteristics of the users may be compared to the characteristics of the requesting user to determine commonalities and those commonalities may be included in the basis information that is output along with the final answer to give further reasons why the requesting user may find the provided answer of relevance to them.

Finally, the output of the final answer may include a request for the requesting user to provide user feedback as to the usefulness or accuracy of the final answer. This user feedback information may then be used to update the basis information associated with the answer in the log of communications associated with the recipient user, i.e. Dave in this example. Thus, the statistical numbers associated with the answer may be updated to reflect the additional user feedback from Samantha.

Figure 5:
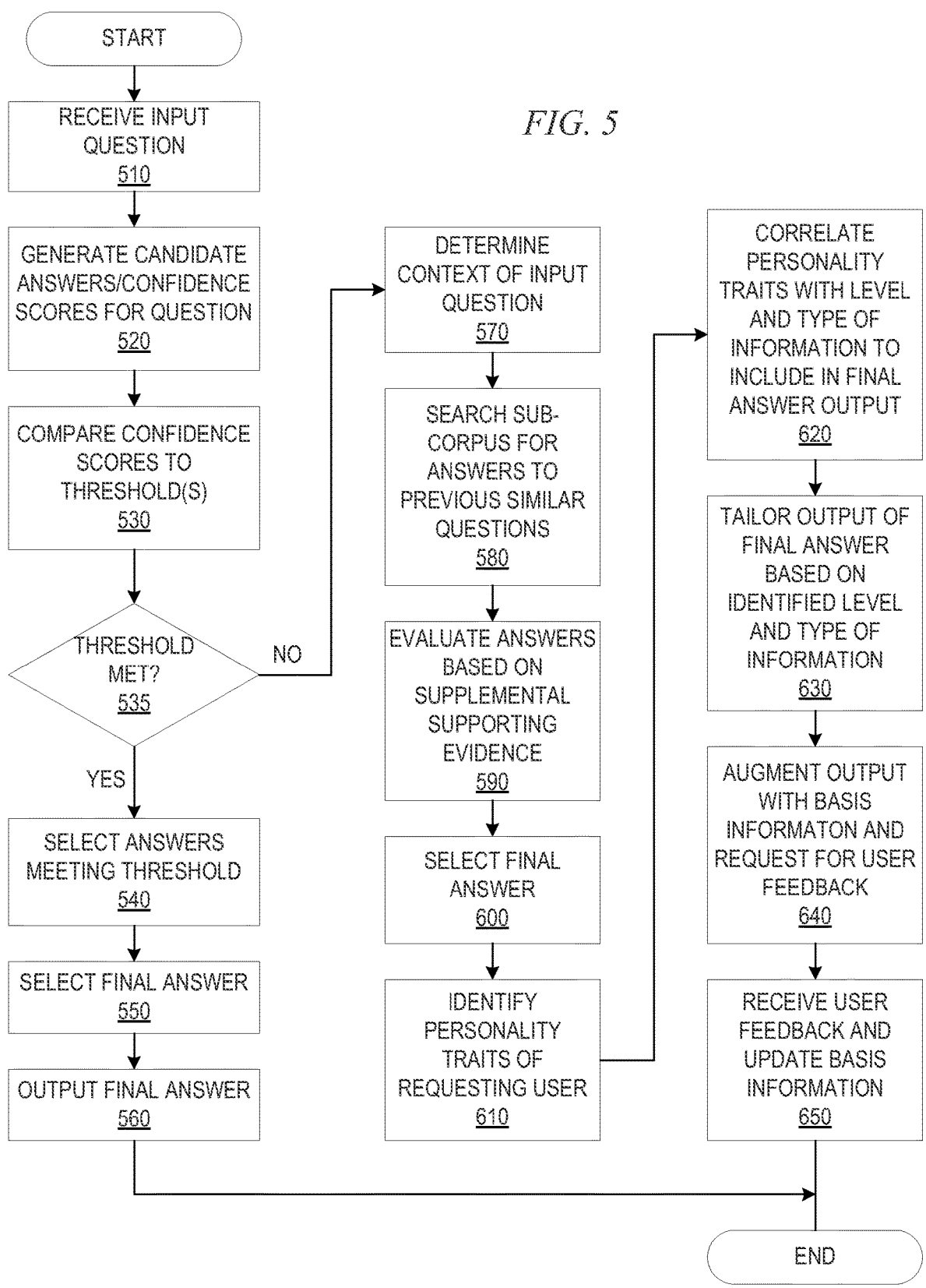
FIG. 5 is a flowchart outlining an example operation of a context based answer augmentation engine in accordance with one illustrative embodiment.

FIG. 5 is a flowchart outlining an example operation of a context based answer augmentation engine in accordance with one illustrative embodiment. As shown in FIG. 5, the operation starts with receiving an input question for which an answer is sought (step 510). As discussed above, this receiving of the input question may be based on a monitoring of a communication system and the input question being exchanged as part of a communication exchange between client computing devices of two or more users or may be received as a direct input by a user to the cognitive system for answering of the question.

The input question is processed by the QA pipeline of the cognitive system to generate one or more candidate answers and corresponding confidence scores (step 520). The confidence scores are compared to one or more threshold confidence scores to determine if any of the one or more candidate answers meets or exceeds the one or more threshold confidence scores and thus, has strong supporting evidence that the corresponding candidate answer is a correct answer for the input question (step 530). If so (step 535: YES), then the corresponding candidate answer is returned as a potentially correct answer for the input question and may be used as a basis for selecting a final answer to the input question (step 540). A final answer is selected from those candidate answers having confidence scores equal to or above the one or more thresholds (step 550) and the final answer is output (step 560). It should be noted that, although not shown in FIG. 5, the output of the final answer may be customized using the mechanisms of the illustrative embodiments in the manner described herein even though a context-based answer selection is not performed.

If a candidate answer with a sufficiently high enough confidence score, as determined by the comparison to the one or more threshold confidence score values, is not identified (step 535:NO), then a context based selection and/or generation of a candidate answer is initiated to identify an answer to the input question. In the case of a context based answer selection/generation, a context of the input question is determined (step 570). Based on the identified context, the corresponding sub-corpus is searched to identify candidate answers to the input question and/or filter the previously generated set of candidate answers based on identified similar questions in the sub-corpus (step 580). Additional supporting evidence for any of the candidate answers may be obtained from the corpus as a whole and used to supplement the candidate answer supporting evidence and/or ultimately provide additional content for output to the requesting user as a final answer to the input question (step 590). From the set of candidate answers generated as a result of the context based question answering performed by the cognitive system, and the candidate answers previously identified by the QA pipeline, a final answer is selected for output to the requesting user (step 600).

The personality traits of the requesting user are identified through user profiles and generation of a user model (step 610). The personality traits are correlated with a level and type of information that resonates with the requesting user (step 620) and the output of the final answer is tailored or customized to the particular personality traits of the requesting user based on the correlation (step 630). The final answer output is augmented to include basis information and a request for user feedback (step 640). User feedback is received from the requesting user and used to update the basis information associated with the final answer (step 650). The operation then terminates.

Thus, the illustrative embodiments provide mechanisms for providing context based answer selection for input questions based on a context of previous answers provided to similar questions. Moreover, the illustrative embodiments provide mechanisms for customizing or tailoring the output of a final answer to a question to the personality traits of the particular requesting user. Furthermore, the output of the final answer may be augmented with basis information indicating other users to which the answer was provided, which of these users found the answer useful, and correlations between these other users and the currently requesting user. In this way, the user is able to automatically receive answers to questions that are more likely to resonate with the requesting user by providing the answers with a level and type of information detail that correlates with the user's personality.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a Question and Answer (QA) system comprising a processor and a memory, the method comprising:
    monitoring, by a communication system monitoring engine of the QA system, a communication exchange between a first computing device associated with a first party of the communication exchange, and a second computing device associated with a second party of the communication exchange;
    automatically identifying, by the communication system monitoring engine of the QA system, an input question, for which an answer is sought, in content of the communication exchange between the first computing device and the second computing device;
    processing, by the QA system, the input question to generate one or more candidate answers and corresponding confidence scores;
    determining, by the QA system, whether to perform the context based selection of a final answer from the one or more candidate answers based on the corresponding confidence scores;
    in response to determining to not perform context based selection of the final answer, selecting, by the QA system, the final answer from the one or more candidate answers based on a ranking of the corresponding confidence scores;
    in response to determining to perform context based selection of the final answer, performing, by a context based answer selection engine of the QA system, context based selection of a final answer from the one or more candidate answers based on a context of the communication exchange in which the input question is identified; and
    outputting by an output customization engine of the QA system, the selected final answer as a final answer to the input question via at least one of the first computing device or the second computing device, wherein the context based selection comprises:
        determining, by the QA system, a context of the input question; and
        selecting, by the QA system, a final answer from the one or more candidate answers based on the context of the input question, wherein the selected final answer is an answer previously provided in association with the context of the input question.

2. The method of claim 1, wherein the context represents one or more of a party in the communication exchange or a concept that is a focus of the communication exchange, and wherein the selected final answer is an answer that is at least one of previously provided by the party to a same or similar question to that of the input question or an answer provided by the party or another party associated with the concept.

3. The method of claim 1, wherein determining whether to perform the context based selection of the final answer from the one or more candidate answers based on the corresponding confidence scores comprises:
    determining whether at least one confidence score of at least one candidate answer in the one or more candidate answers meets or exceeds a predetermined threshold;
    in response to determining that at least one confidence score of at least one candidate answer meets or exceeds the predetermined threshold, determining to not perform context based selection of the final answer; and
    in response to determining that none of the corresponding confidence scores meet or exceed the predetermined threshold, determining to perform context based selection of the final answer.

4. The method of claim 1, wherein the context of the input question represents a party in the communication exchange, and wherein outputting the selected final answer further comprises tailoring the output of the selected final answer based on a personality trait of the party.

5. The method of claim 4, further comprising:
    retrieving a profile for the party, wherein the profile comprises personal information associated with the party;
    determining a personality trait of the party based on the personal information associated with the party in the profile; and
    modifying the output of the selected final answer based on the personality trait of the party.

6. The method of claim 4, wherein the context of the input question representing the party in the communication exchange comprises a historical set of questions and answers previously answered by the party during previous communication exchanges.

7. The method of claim 4, wherein tailoring the output of the selected final answer based on a personality trait of the party comprises:
    retrieving, from configuration information, a mapping of personality traits to corresponding types of information to be output with the selected final answer; and
    outputting information from supporting evidence associated with the selected final answer that corresponds to the types of information mapped to the personality trait of the party.

8. The method of claim 4, wherein tailoring the output of the selected final answer based on the personality trait of the party further comprises augmenting the output with basis information for the selected final answer.

9. The method of claim 5, wherein tailoring the output of the selected final answer based on the personality trait of the party further comprises retrieving, from the profile, statistical information regarding user feedback indicating user indications of usability of the selected final answer and information about types of users providing the user feedback.

10. The method of claim 1, wherein the communication exchange is an instant messaging exchange between at least two parties, and wherein the input question is received via background monitoring of the communication exchange by the QA system.

11. A computer program product comprising a computer readable storage medium having a computer readable program stored therein, wherein the computer readable program, when executed on a computing system implementing a Question and Answer (QA) system, causes the computing system to:

monitor, by a communication system monitoring engine of the QA system, a communication exchange between a first computing device associated with a first party of the communication exchange, and a second computing device associated with a second party of the communication exchange;

automatically identify, by the communication system monitoring engine of the QA system, an input question, for which an answer is sought, in content of the communication exchange between the first computing device and the second computing device;

process, by the QA system, the input question to generate one or more candidate answers and corresponding confidence scores;

determine, by the QA system, whether to perform the context based selection of a final answer from the one or more candidate answers based on the corresponding confidence scores;

in response to determining to not perform context based selection of the final answer, select, by the QA system, the final answer from the one or more candidate answers based on a ranking of the corresponding confidence scores;

in response to determining to perform context based selection of the final answer, perform, by a context based answer selection engine of the QA system, context based selection of a final answer from the one or more candidate answers based on a context of the communication exchange in which the input question is identified; and output, by an output customization engine of the QA system, the selected final answer as a final answer to the input question via at least one of the first computing device or the second computing device, wherein the context based selection comprises:

determining, by the QA system, a context of the input question; and selecting, by the QA system, a final answer from the one or more candidate answers based on the context of the input question, wherein the selected final answer is an answer previously provided in association with the context of the input question.

12. The computer program product of claim 11, wherein the context represents one or more of a party in the communication exchange or a concept that is a focus of the communication exchange, and wherein the selected final answer is an answer that is at least one of previously provided by the party to a same or similar question to that of the input question or an answer provided by the party or another party associated with the concept.

13. The computer program product of claim 11, wherein the computer readable program further causes the computing system to determine whether to perform the context based selection of the final answer from the one or more candidate answers based on the corresponding confidence scores at least by:

determining whether at least one confidence score of at least one candidate answer in the one or more candidate answers meets or exceeds a predetermined threshold;

in response to determining that at least one confidence score of at least one candidate answer meets or exceeds the predetermined threshold, determining to not perform context based selection of the final answer; and in response to determining that none of the corresponding confidence scores meet or exceed the predetermined threshold, determining to perform context based selection of the final answer.

14. The computer program product of claim 11, wherein the context of the input question represents a party in the communication exchange, and wherein the computer readable program further causes the computing system to output the selected final answer further at least by tailoring the output of the selected final answer based on a personality trait of the party.

15. The computer program product of claim 14, wherein the computer readable program further causes the computing system to:

retrieve a profile for the party, wherein the profile comprises personal information associated with the party;

determine a personality trait of the party based on the personal information associated with the party in the profile; and modify the output of the selected final answer based on the personality trait of the party.

16. The computer program product of claim 14, wherein the context of the input question representing the party in the communication exchange comprises a historical set of questions and answers previously answered by the party during previous communication exchanges.

17. The computer program product of claim 14, wherein the computer readable program further causes the computing system to tailor the output of the selected final answer based on a personality trait of the party at least by:

retrieving, from configuration information, a mapping of personality traits to corresponding types of information to be output with the selected final answer; and outputting information from supporting evidence associated with the selected final answer that corresponds to the types of information mapped to the personality trait of the party.

18. The computer program product of claim 14, wherein the computer readable program further causes the computing system to tailor the output of the selected final answer based on the personality trait of the party further at least by augmenting the output with basis information for the selected final answer.

19. The computer program product of claim 15, wherein the computer readable program further causes the computing system to tailor the output of the selected final answer based on the personality trait of the party further at least by retrieving, from the profile, statistical information regarding user feedback indicating user indications of usability of the selected final answer and information about types of users providing the user feedback.

20. The computer program product of claim 11, wherein the communication exchange is an instant messaging exchange between at least two parties, and wherein the input question is received via background monitoring of the communication exchange by the QA system.

21. An apparatus comprising:
a processor; and
a memory coupled to the processor, wherein the memory comprises instructions which, when executed by the processor, cause the processor to implement a Question and Answer (QA) system that operates to:

monitor, by a communication m monitoring engine of the OA system, a communication exchange between a first computing device associated with a first party of the communication exchange, and a second computing device associated with a second party of the communication exchange;

automatically identify, by the communication system monitoring engine of the QA system, an input question for which an answer is sought, in content of the communication exchange between the first computing device and the second computing device;

process, by the QA system, the input question to generate one or more candidate answers and corresponding confidence scores;

determine, by the QA system, whether to perform the context based selection of a final answer from the one or more candidate answers based on the corresponding confidence scores;

in response to determining to not perform context based selection of the final answer, select, by the QA system, the final answer from the one or more candidate answers based on a ranking of the corresponding confidence scores;

in response to determining to perform context based selection of the final answer, perform, by a context based answer selection engine of the QA system, context based selection of a final answer from the one or more candidate answers based on a context of the communication exchange in which the input question is identified; and output, by an output customization engine of the QA system, the selected final answer as a final answer to the input question via at least one of the first computing device or the second computing device, wherein the context based selection comprises:

determining a context of the input question; and selecting a final answer from the one or more candidate answers based on the context of the input question, wherein the selected final answer is an answer previously provided in association with the context of the input question.

* * * * *